US012811074B2

(12) United States Patent
Tannhäuser

(10) Patent No.: US 12,811,074 B2
(45) Date of Patent: Nov. 24, 2026

(54) CIRCUIT BREAKER DEVICE HAVING SEMICONDUCTOR-BASED SWITCHING ELEMENTS AND METHOD FOR PROTECTING A LOW-VOLTAGE AC CIRCUIT

(71) Applicant: Siemens Aktiengesellschaft, Munich (DE)

(72) Inventor: Marvin Tannhäuser, Hausen (DE)

(73) Assignee: Siemens Aktiengesellschaft, Munich (DE)

( * ) Notice: Subject to any disclaimer, the term of this patent is extended or adjusted under 35 U.S.C. 154(b) by 224 days.

(21) Appl. No.: 18/792,841

(22) Filed: Aug. 2, 2024

(65) Prior Publication Data

US 2025/0046536 A1 Feb. 6, 2025

(30) Foreign Application Priority Data

Aug. 2, 2023 (DE) ..................... 10 2023 207 405.2
Sep. 28, 2023 (EP) ..................................... 23200428

(51) Int. Cl.
*H01H 9/54* (2006.01)
*H01H 71/12* (2006.01)
*H02H 3/08* (2006.01)

(52) U.S. Cl.
CPC ............ *H01H 9/547* (2013.01); *H01H 9/548* (2013.01); *H01H 71/125* (2013.01); *H02H 3/085* (2013.01)

(58) Field of Classification Search
CPC ...... H01H 9/547; H01H 9/548; H01H 71/125; H01H 2011/0068; H01H 9/542;
(Continued)

(56) References Cited

U.S. PATENT DOCUMENTS 4,019,097 A * 4/1977 Miller .................... H01H 71/14 361/93.7
2010/0277846 A1* 11/2010 Koshin .................. H01H 9/548 361/101

(Continued)

FOREIGN PATENT DOCUMENTS

CN 114400515 A 4/2022
DE 102019213604 A1 * 3/2021 ........... H02H 1/0007
DE 102021210820 A1 3/2023

*Primary Examiner* — Sreeya Sreevatsa
(74) *Attorney, Agent, or Firm* — Laurence A. Greenberg; Werner H. Stemer; Ralph E. Locher

(57) ABSTRACT

A circuit breaker protects a low-voltage AC circuit. The circuit breaker contains a housing having grid-side phase connection terminals and load-side phase connection terminals for phase conductors of the low-voltage circuit and a series circuits made up of a mechanical phase contact and an electronic switch having switching elements. Each series circuit connects a grid-side phase connection terminal to a load-side phase connection terminal. The electronic switches can be switched to a high-impedance state of the switching elements to prevent a flow of current or to a low-impedance state of the switching elements to allow the flow of current. A temperature sensor is provided for each series circuit, for determining the level of the temperature of a connection terminal. When a first temperature threshold value of a temperature sensor is exceeded, the electronic switch is switched to a high-impedance state to prevent overheating.

26 Claims, 7 Drawing Sheets

(58) Field of Classification Search
CPC .......... H01H 9/541; H01H 9/30; H01H 37/54; H02H 3/085; H02H 3/08; H02H 5/04; H02H 7/222
USPC .......................................................... 361/115
See application file for complete search history.

(56) References Cited

U.S. PATENT DOCUMENTS

2013/0300491 A1 11/2013 Boe et al.
2019/0103742 A1* 4/2019 Kennedy ................ H01H 89/00
2021/0344187 A1* 11/2021 Namuduri ................ H02H 3/08

* cited by examiner

CIRCUIT BREAKER DEVICE HAVING SEMICONDUCTOR-BASED SWITCHING ELEMENTS AND METHOD FOR PROTECTING A LOW-VOLTAGE AC CIRCUIT

CROSS-REFERENCE TO RELATED APPLICATION

This application claims the priority, under 35 U.S.C. § 119, of German Patent Application DE 10 2023 207 405.2, filed Aug. 2, 2023, and European Patent Application EP 23200428.3 filed Sep. 28, 2023; both prior applications are herewith incorporated by reference in their entireties.

FIELD AND BACKGROUND OF THE INVENTION

Irrespective of the grammatical gender of a specific term, persons with male, female or other gender identity are also included.

The invention relates to the technical field of a circuit breaker device for a low-voltage circuit having electronic switches and to a method for a circuit breaker device for a low-voltage circuit having electronic switches.

Low voltage is understood to mean voltages of up to 1,000 volts AC or up to 1,500 volts DC. Low voltage is understood in particular to mean voltages that are greater than extra-low voltage, with values of 50 volts AC or 120 volts DC.

A low-voltage circuit or grid or installation is understood to mean circuits with nominal currents or rated currents of up to 125 amperes, more specifically up to 63 amperes. A low-voltage circuit is understood to mean in particular circuits with nominal currents or rated currents of up to 50 amperes, 40 amperes, 32 amperes, 25 amperes, 16 amperes or 10 amperes. The current values are understood to mean in particular nominal, rated or/and shutdown currents, that is to say the maximum current that is normally carried through the circuit or at which the electrical circuit is usually interrupted, for example by a protection device, such as a circuit breaker device, miniature circuit breaker or power circuit breaker. The nominal currents may be gradated further, from 0.5 A through 1 A, 2 A, 3 A, 4 A, 5 A, 6 A, 7 A, 8 A, 9 A, 10 A, etc. up to 16 A.

Miniature circuit breakers are overcurrent protection devices that have long been known and that are used in low-voltage circuits in electrical installation engineering. They protect lines against damage caused by heating due to excessively high current and/or a short circuit. A miniature circuit breaker may automatically shut down the circuit in the event of an overload and/or short circuit. A miniature circuit breaker is not a fuse element that resets automatically.

In contrast to miniature circuit breakers, power circuit breakers are intended for currents greater than 125 A, in some cases also starting from 63 amperes. Miniature circuit breakers therefore have a simpler and more delicate design. Miniature circuit breakers usually have a fastening option for fastening to a so-called top-hat rail (carrier rail, DIN rail, TH35).

Miniature circuit breakers have an electromechanical design. In a housing, they have a mechanical switching contact or shunt opening release for interrupting (tripping) the electrical current. A bimetallic protection element or bimetallic element is usually used for tripping (interruption) in the case of a longer-lasting overcurrent (overcurrent protection) or in the event of a thermal overload (overload protection). An electromagnetic release with a coil is used for brief tripping if an overcurrent limit value is exceeded or in the event of a short circuit (short-circuit protection). One or more arc quenching chamber(s) or arc quenching devices are provided. Connection elements for conductors of the electrical circuit to be protected are also provided.

Circuit breaker devices having an electronic interruption unit or an electronic switch are relatively recent developments. They have a semiconductor-based electronic interruption unit/switch. In other words, the flow of electric current in the low-voltage circuit is guided via semiconductor components or semiconductor switches that are able to interrupt the flow of electric current or are able to be switched to the on state. Circuit breaker devices having an electronic interruption unit/switch often also have a mechanical isolating contact unit having contacts, in particular with isolator properties in accordance with the applicable standards for low-voltage circuits, which contacts of the mechanical isolating contact unit are connected in series with the electronic interruption unit/electronic switches, that is to say the current of the low-voltage circuit that is to be protected is guided both through the mechanical isolating contact unit/the mechanical contact and through the electronic interruption unit/the electronic switch.

The present invention relates in particular to low-voltage AC circuits having an AC voltage, usually having a time-dependent sinusoidal AC voltage of the frequency f. The temporal dependence of the instantaneous voltage value u(t) of the AC voltage is described by the equation:

$$u(t) = U * \sin(2\pi * f * t),$$

where:

u(t)=instantaneous voltage value at the time t, and

U=amplitude of the voltage.

A harmonic AC voltage can be represented by the rotation of a phasor, the length of which equals the amplitude (U) of the voltage. The instantaneous deflection is the projection of the phasor onto a coordinate system. An oscillation period corresponds to a full revolution of the phasor and its full angle is 2π (2pi) or 360°. The angular frequency is the rate of change of the phase angle of this rotating phasor. The angular frequency of a harmonic oscillation is always 2π times its frequency, that is to say:

$$\omega = 2\pi * f = 2\pi / T = \text{angular frequency of the AC voltage}$$

(T=period duration of the oscillation).

It is often preferred to give the angular frequency (ω) rather than the frequency (f), since many formulae in oscillation theory can be represented more compactly using the angular frequency due to the occurrence of trigonometric functions, the period of which is by definition 2π:

$$u(t) = U * \sin(\omega t).$$

In the case of angular frequencies that are not constant over time, the term instantaneous angular frequency is also used.

In the case of a sinusoidal AC voltage, in particular an AC voltage that is constant over time, the time-dependent value formed from the angular velocity ω and the time t corresponds to the time-dependent angle φ(t) which is also referred to as the phase angle φ(t).

That is to say, the phase angle φ(t) periodically passes through the range 0 . . . 2π or 0° . . . 360°. That is to say, the phase angle periodically assumes a value of between 0 and 2π or 0° and 360° (φ=n*(0 . . . 2π) or φ=n*(0° . . . 360°) on account of periodicity; in abbreviated form: φ=0 . . . 2π or φ=0° . . . 360°).

The instantaneous voltage value u(t) is therefore used to mean the instantaneous value of the voltage at the time t, that is to say, in the case of a sinusoidal (periodic) AC voltage, the value of the voltage at the phase angle φ (φ=0 . . . 2π or φ=0° . . . 360°, of the respective period). The same applies with respect to instantaneous current values i(t) etc.

SUMMARY OF THE INVENTION

The object of the present invention is to improve a circuit breaker device of the type mentioned at the outset, in particular to avoid destruction, damage or an impermissible operating state (in particular an impermissible operating temperature) of a multi-phase circuit breaker device, in particular of the connection terminals thereof.

This object is achieved by a circuit breaker device having the features of the independent circuit breaker device claim, and by a method as claimed in the independent method claim.

According to the invention, a circuit breaker device for protecting an electrical multi-phase low-voltage AC circuit, in particular a three-phase AC circuit, is proposed, containing:

a housing having grid-side phase connection terminals and load-side phase connection terminals for phase conductors of the low-voltage AC circuit (the connection terminals serve to connect external conductors of the low-voltage circuit to be protected to the circuit breaker device), series circuits made up of a mechanical phase contact and an electronic switch, wherein each series circuit (electrically) connects one of the grid-side phase connections to one of the load-side phase connections, the mechanical phase contacts can be switched to open together to prevent a flow of current or to close together to allow a flow of current, in particular the mechanical contacts are connected to one another via a mechanical coupling, the electronic switches can be switched, by means of semiconductor-based switching elements, to a high-impedance state of the switching elements to prevent a flow of current, or to a low-impedance state of the switching elements to allow the flow of current, the electronic switches can be switched independently of one another to a high-impedance or low-impedance state, at least one temperature sensor is provided for each series circuit (so that each series circuit has at least one temperature sensor), for determining the level of the temperature of at least one connection terminal of the respective series circuits (the at least one temperature sensor of the series circuit is provided specifically at (e.g. on or in the region of) the connection terminal), (in particular both the grid-side phase connection terminal of a series circuit has a grid-side temperature sensor, and the load-side phase connection terminal of a series circuit has a load-side temperature sensor), and the circuit breaker device is configured in such a way that when a first temperature threshold value of a temperature sensor of a series circuit is exceeded, the electronic switch of the series circuit is switched to a high-impedance state for preventing a flow of current in order to prevent overheating of the connection terminal or (generally) of the circuit breaker device.

Preventing overheating means that the circuit breaker device, in particular the connection terminal, remains within its permissible thermal limits or permissible (device) temperatures.

The temperature sensors can be connected to a control unit, which in turn is connected to the jointly switched mechanical contacts and the electronic switches.

This has the advantage that overheating of the circuit breaker device, in particular of one or selected or all connection terminal(s), is prevented. This can avert thermal overload or thermal destruction, thereby preventing, for example, a cable fire of the connected conductors. By preventing the flow of current, heating of the circuit breaker device/the associated connection terminal is prevented and a safe state is established.

Further advantageous embodiments of the invention are specified in the subclaims and in the exemplary embodiment.

In an advantageous embodiment of the invention, when a first temperature threshold value of a temperature sensor of a series circuit is exceeded, all the electronic switches (in the series circuit) are switched to a high-impedance state for preventing a flow of current in order to prevent overheating.

This has the particular advantage that a behavior similar to conventional miniature circuit breakers is provided and, in particular, all of the phase conductors are switched to prevent a flow of current, which is advantageous especially for 3-phase consumers. In addition, the circuit breaker device can cool down faster due to the lack of current flow from the other series circuits.

In an advantageous embodiment of the invention, a current sensor unit is provided for each series circuit, for determining the level of the current in the respective phase conductors, in particular in such a way that instantaneous current values (are determined and) are available.

A control unit that is connected to the current sensor units, the temperature sensors, the (jointly switched) mechanical phase contacts and the electronic switches is provided. The circuit breaker device is designed in such a way that when at least one first current threshold value is exceeded in a phase conductor, a process for preventing a flow of current in the phase conductor in question is initiated by the electronic switch in question, in particular for a first period of time.

This has the particular advantage that, when a specified current threshold or a current/time threshold is exceeded (that is to say the current threshold value is exceeded for a defined time limit), only the conductor in question (or the conductors in question) is selectively interrupted. A flow of current is still enabled in the other conductors (non-affected conductors) in a multi-phase low-voltage AC circuit.

The prevention for a first period of time means that switching-on again or becoming low-impedance takes place advantageously after the first period of time, so that the reliability of supply continues to be guaranteed or it is possible to continue checking for the presence of the exceeding of the current threshold. This can be carried out advantageously, in particular, by evaluating instantaneous values of the level of the current.

In an advantageous embodiment of the invention, the first period of time is less than 20 ms, in particular less than 10 ms.

This has the particular advantage that for a half wave or full wave of the voltage or the current in the AC circuit, in the example (20 ms, 10 ms) based on a grid frequency of 50

Hz, an interruption occurs, so that electrical supply reliability is restored with the next full or half wave. In particular, after an interruption, the change to low-impedance can occur in the region of the next zero crossing (in the zero crossing or in the range of 1 ms before or after said zero crossing).

In an advantageous embodiment of the invention, the mechanical phase contacts are part of a mechanical isolating contact unit, which opens or closes the phase contacts together. In particular, the mechanical isolating contact unit has an accessible handle on the circuit breaker device, for manually opening or closing the phase contacts (of the mechanical isolating contact unit).

This has the particular advantage that complete galvanic isolation of all of the phase conductors is carried out simultaneously, in contrast to the electronic switches changing to high impedance in a manner based on phase and so as to prevent a flow of current. The handle enables compatible behavior in accordance with conventional electromechanical circuit breaker devices.

In an advantageous embodiment of the invention, the circuit breaker device is designed in such a way that the mechanical isolating contact unit can be opened, but not closed, by way of the control unit. In particular, closing of the mechanical isolating contact unit by way of the handle is only possible after an enable by way of the control unit.

This has the particular advantage that the safety of the circuit breaker device is increased, as the control unit cannot accidentally (incorrectly) close the contacts.

In an advantageous embodiment of the invention, the electronic switches are part of an electronic interruption unit, wherein the electronic switches can be switched independently of one another.

This has the particular advantage that a compact electronic interruption unit that combines the electronic switches is provided, such that a space-saving design is made possible and synergy effects of components can be utilized.

In an advantageous embodiment of the invention, the electronic interruption unit/the electronic switches has/have a bidirectional dielectric strength. In particular, overvoltage protection is provided for the semiconductor-based switching elements.

This has the particular advantage that it is robust against overvoltages and that it is possible to switch off an inductive line circuit.

In an advantageous embodiment of the invention, the mechanical phase contacts are assigned to the load-side phase connection terminals, and the electronic switches are assigned to the grid-side phase connection terminals.

This has the particular advantage that an advantageous circuit breaker device design is provided, which supports phase-related switching of the electronic switches, and allows a self-test (in particular a self-test of the electronic switches or the electronic interruption unit), even when the contacts are open. In addition, a power supply to the circuit breaker device is ensured, even when the contacts are open. This provides a structure for a circuit breaker device in which the circuit breaker device can function even when the contacts are open.

In an advantageous embodiment of the invention, a grid-side neutral-conductor connection terminal and a load-side neutral-conductor connection terminal are provided for a neutral conductor of the multi-phase low-voltage AC circuit, in particular three-phase low-voltage AC circuit.

The grid-side neutral-conductor connection terminal is (electrically) connected directly or via a mechanical neutral-conductor contact to the load-side neutral-conductor connection terminal.

For the neutral-conductor connection terminals is provided at least one temperature sensor for determining the level of the temperature of at least one neutral-conductor connection terminal. In particular, a grid-side temperature sensor is provided for the grid-side neutral-conductor connection terminal, and a load-side temperature sensor is provided for the load-side neutral-conductor connection terminal, so that it is possible to determine the level of the temperature of the grid-side neutral-conductor connection terminal and the level of the temperature of the load-side neutral-conductor connection terminal.

When a first temperature threshold value (1.SW) of the at least one temperature sensor of the neutral-conductor connection terminals is exceeded, the electronic switches of the series circuits are switched to a high-impedance state for preventing a flow of current in order to prevent overheating. That is to say, when a neutral-conductor connection terminal temperature is too high, all the phase conductors change to high impedance.

Alternatively, all the mechanical contacts can be opened.

This has the particular advantage that a multi-pole circuit breaker device is provided in which also at least one neutral-conductor connection terminal is monitored, and the flow of current is interrupted (in particular galvanically) if applicable.

In an advantageous embodiment of the invention, the mechanical neutral-conductor contact can be opened or closed (can be switched) together with the phase contacts. The mechanical neutral-conductor contact is switched together with the mechanical phase contacts. In particular, the neutral-conductor contact is closed before the phase contacts are closed, or the neutral-conductor contact is opened after the phase contacts are opened.

This has the particular advantage that the neutral-conductor contact always opens and closes with no current flowing. This reduces the wear of the contact and increases the service life. Furthermore, this prevents an arc from arising when the neutral-conductor contact is opened.

In an advantageous embodiment of the invention, the mechanical contacts are opened in the case of an initiated high-impedance state of the electronic switch for preventing overheating and when a higher second temperature threshold value is exceeded (that is to say the second temperature threshold value is higher than the first temperature threshold value).

This has the particular advantage that an additional degree of safety is provided in the circuit breaker device. If there is increased heating despite initiated high-impedance electronic switches, this could be due to the fact that the electronic switch is not or not sufficiently high-impedance and a (faulty) flow of current leads to further heating of the circuit breaker device/connection terminal. In this case, the contacts are opened in order to achieve galvanic isolation and thus completely prevent the flow of current. This additional safety measure avoids destruction of the circuit breaker device/connection terminals.

In an advantageous embodiment of the invention, the electronic switch is switched to a low-impedance state (for allowing a flow of current in the low-voltage circuit) in the case of a high-impedance state of the electronic switch for preventing overheating and when a third temperature threshold value is undershot. The third temperature threshold value is lower than the first temperature threshold value.

This has the particular advantage that a flow of current is enabled again after the circuit breaker device/connection terminal has cooled down. This means that the circuit breaker device is always in a safe operating state.

In an advantageous embodiment of the invention, alternatively, the electronic switch is switched to the low-impedance state (for allowing a flow of current in the low-voltage circuit) in the case of a high-impedance state of the electronic switch for preventing overheating and when a first time period has elapsed since the start of the high-impedance state of the electronic switch (to prevent overheating).

For example, the first time period may be in the order of magnitude of 5 minutes, 10 minutes, 15 minutes, 20 minutes, 25 minutes, or 30 minutes.

This has the particular advantage that a fixed cooling time (first time period) is implemented. A flow of current is enabled again after the circuit breaker device/connection terminal has cooled down.

In an advantageous embodiment of the invention, the mechanical contacts are opened in the event of a change to the high-impedance state for preventing overheating (and back to the low-impedance state), the change exceeding a first number, within a first-time frame.

For example, the first-time frame may be one hour, several hours, such as 3 hours, 5 hours, 6 hours, 10 hours, 12 hours, 18 hours, 24 hours (one day), several days, one week. For example, the number of changes can start from 2, 3, 4, . . . , 10, . . . 20 changes.

This has the particular advantage that, in the event of a frequent temperature-related change to the high-impedance state (from the low-impedance to the high-impedance state), additional safety is implemented, and the contacts are opened to perform galvanic isolation and completely prevent a heating flow of current. This prevents a further change to the high-impedance state (to the high-impedance state and back to the low-impedance state) of the electronic switch(es) and ensures safety in the low-voltage circuit.

In an advantageous embodiment of the invention, a communication unit (which is connected to the control unit) is provided. A warning is issued by means of the communication unit when a fourth temperature threshold value is exceeded. The fourth temperature threshold value is lower than the first temperature threshold value.

For example, the fourth temperature threshold value may be 10, . . . , 20, . . . , 30, . . . , 40 Kelvin lower than the first temperature threshold value.

This has the particular advantage that an indication is communicated when a temperature threshold value is reached, so that, for example or advantageously, a cause determination process can be carried out before a shutdown due to an overtemperature occurs.

As an alternative or in addition, the level of the temperature (or an equivalent) of the temperature sensor can be issued (communicated) by means of the communication unit.

This has the particular advantage that (central) temperature monitoring of one or more circuit breaker devices can be carried out, so that appropriate measures can be taken as temperatures rise.

In an advantageous embodiment of the invention, a display unit is provided on the circuit breaker device, which display unit is connected to the control unit and has visible display means for displaying the exceeding of temperature limits (first or/and second or/and third or/and fourth) or (and) the level of the temperature, in particular with reference to a conductor (phase conductor, neutral conductor); alternatively or additionally, for indicating a high-impedance or low-impedance state of the electronic switches.

This has the particular advantage that a visualization of the temperature state is provided.

In an advantageous embodiment of the invention, the mechanical contacts can be opened by way of the control unit, but cannot be closed by way of the control unit.

This has the particular advantage that the safety of the circuit breaker device is high, as the contacts cannot be incorrectly closed within the circuit breaker device.

In an advantageous embodiment of the invention, the mechanical contacts have a release functionality. This may be a release functionality that is provided in accordance with current standards; in particular in such a way that the contacts can be opened by the control unit, even if the mechanical handle is blocked, that is to say, for example, if the handle becomes/is blocked for the state in which the contacts are closed.

This has the particular advantage of providing a high level of safety and a circuit breaker device for low-voltage circuits that in particular is in line with standards. The flow of current can be interrupted galvanically at any time by opening the contacts.

In an advantageous continuation of the embodiment, the circuit breaker device is configured in such a way that, when the control unit is used to initiate a change to the low-impedance state, for example when the third temperature threshold value is undershot, the electronic switch comes to have a low impedance at the respective zero crossing of the voltage (or at a voltage that is less than 50 V, 25 V, in particular less than 10 V).

This has the particular advantage that the instances of grid interference are reduced and the load in the switch is lower.

In an advantageous embodiment of the invention, the circuit breaker device is configured in such a way that when (at least) the first current threshold value in a conductor is undershot, a process for preventing a flow of current in the conductor in question is initiated by the electronic switch in question. At the next or next-but-one zero crossing of the voltage, the electronic switch comes to have a low impedance again to allow a flow of current. The control unit is in this case connected to the current sensor units, the temperature sensors, (the) voltage sensor units, the mechanical contacts and the electronic switches.

This has the particular advantage of achieving increased robustness to faulty tripping, and hence achieving increased reliability of electrical supply.

According to the invention, a corresponding method (method claims) for a circuit breaker device for a multi-phase low-voltage AC circuit with electronic (semiconductor-based) switches/switching elements with the same and further advantages is claimed.

The method for a circuit breaker device for protecting an electrical multi-phase low-voltage AC circuit contains:

- a housing having grid-side phase connection terminals and load-side phase connection terminals for phase conductors of the low-voltage circuit, (the connection terminals serve to connect external conductors of the low-voltage circuit to be protected to the circuit breaker device),
- series circuits made up of a mechanical phase contact and an electronic switch, herein each series circuit (electrically) connects a grid-side phase connection terminal to a load-side phase connection terminal, the mechanical phase contacts can be opened together to prevent a flow of current or closed together to allow a flow of current,
- the electronic switches can be switched, by means of semiconductor-based switching elements, to a high-impedance state of the switching elements in order to prevent a flow of current or to a low-impedance state of the switching elements to allow the flow of current, the electronic switches can be switched independently of one another to a high-impedance or low-impedance state in order to (advantageously) prevent or enable a phase-conductor-dependent flow of current, at least one temperature sensor is provided for each series circuit, for determining the level of the temperature of at least one connection terminal of the respective series circuits (in particular, two temperature sensors are provided for determining the level of the temperature of the grid-side connection terminal and for determining the level of the temperature of the load-side connection terminal), and when a first temperature threshold value of a temperature sensor of a series circuit is exceeded, the electronic switch of the series circuit is switched to a high-impedance state for preventing a flow of current in order to prevent overheating (of the circuit breaker device/connection terminal).

Advantageously, when a first temperature threshold value of a temperature sensor of a series circuit is exceeded, all the electronic switches (in the series circuit) are switched to a high-impedance state for preventing a flow of current in order to prevent overheating.

Advantageously, the level of the current in the respective series circuits is determined, and when at least one current threshold value is exceeded in a series circuit, a process for preventing a flow of current in the series circuit in question is initiated by the electronic switch in question, in particular for a first period of time.

Advantageously, the mechanical contacts are opened in the case of an initiated high-impedance state of an electronic switch for preventing overheating and when a higher second temperature threshold value is exceeded.

Advantageously, in the case of a high-impedance state of an electronic switch for preventing overheating and when a third temperature threshold value is undershot, the electronic switch is switched to a low-impedance state. The third temperature threshold value is lower than the first temperature threshold value.

Advantageously, in the case of a high-impedance state of an electronic switch for preventing overheating and when a first time period has elapsed since the start of the high-impedance state for preventing overheating, the electronic switch is switched to the low-impedance state.

Advantageously, the mechanical contacts are opened in the event of a change to the high-impedance state for preventing overheating, the change exceeding a first number, within a first-time frame.

Advantageously, a warning is issued when a fourth temperature threshold value is exceeded.

Advantageously, the level of the temperature of at least one temperature sensor or an equivalent is issued.

All embodiments, both in dependent form referring back to the independent claims, and referring back only to individual features or combinations of features of claims, in particular also the dependent assembly claims referring back to the independent method claim, and vice versa, improve a circuit breaker device, in particular prevent destruction, damage or an impermissible operating state (in particular an impermissible operating temperature) of a circuit breaker device, specifically of the connection terminals.

Other features which are considered as characteristic for the invention are set forth in the appended claims.

Although the invention is illustrated and described herein as embodied in a circuit breaker device and a method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
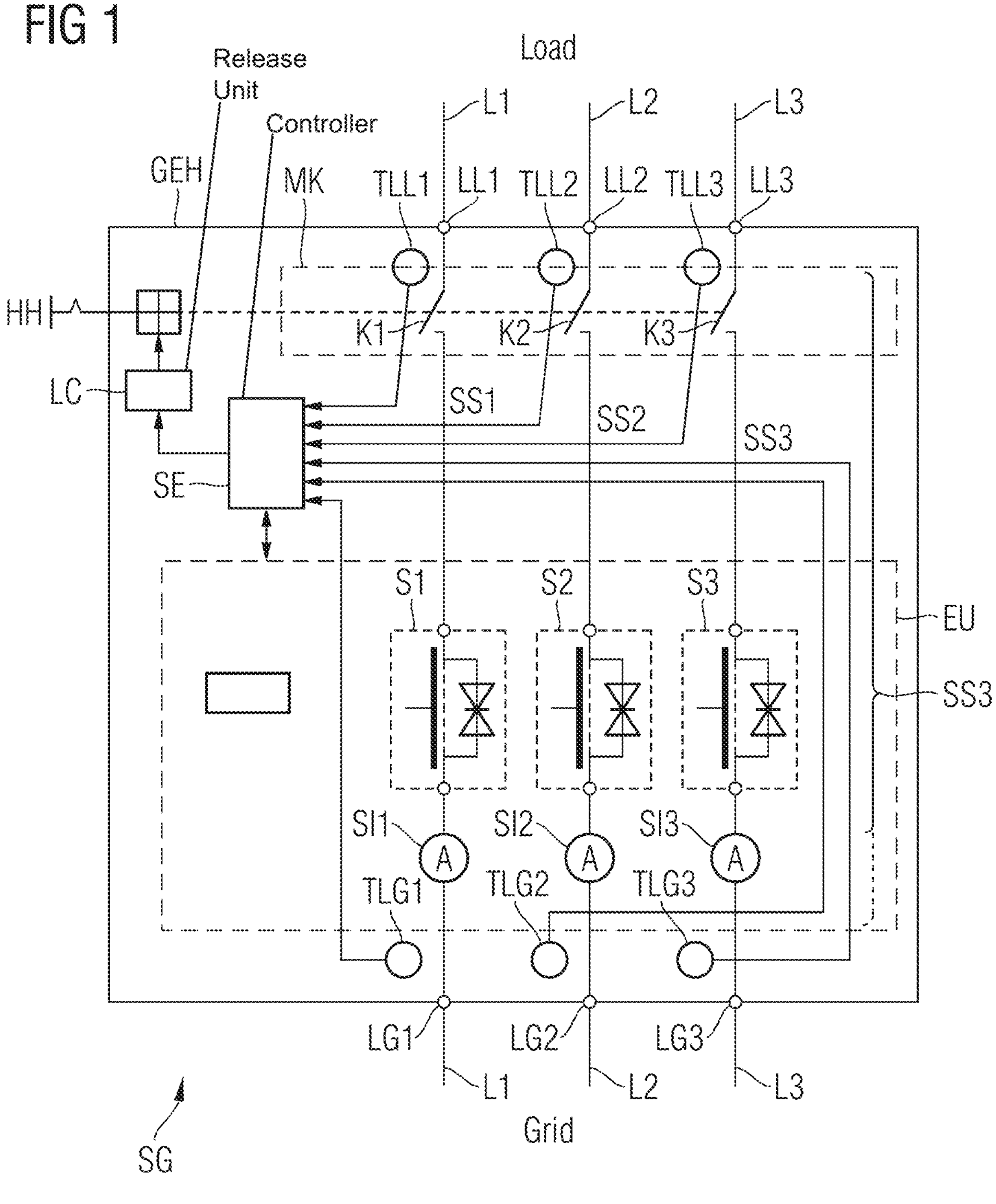
FIG. 1 is a schematic diagram of a first illustration of a circuit breaker device.

Referring now to the figures of the drawings in detail and first, particularly to FIG. 1 thereof, there is shown an exemplary illustration of a 3-pole, for example for 3-phase conductors, circuit breaker device SG for protecting an electrical multi-phase low-voltage AC circuit, in the example in FIG. 1 of a three-phase low-voltage AC circuit. The circuit breaker SG, containing:

a housing GEH having first, second and third grid-side phase connection terminals LG1, LG2, LG3 and first, second and third load-side phase connection terminals LL1, LL2, LL3, for a first, second and third phase conductor L1, L2, L3 of the low-voltage AC circuit, an energy source is usually connected to the grid side Grid, a consumer is usually connected to the load side Load.

In the housing GEH:

a first series circuit SS1 made up of a first mechanical phase contact K1 and a first electronic switch S1, a second series circuit SS2 made up of a second mechanical phase contact K2 and a second electronic switch S2, a third series circuit SS3 made up of a third mechanical phase contact K3 and a third electronic switch S3, wherein:

the first series circuit SS1 (electrically) connects the first grid-side phase connection terminal LG1 to the first load-side phase connection terminal LL1, the second series circuit SS2 (electrically) connects the second grid-side phase connection terminal LG2 to the second load-side phase connection terminal LL2, and the third series circuit SS3 (electrically) connects the third grid-side phase connection terminal LG3 to the third load-side phase connection terminal LL3, the mechanical phase contacts K1, K2, K3 can be switched together, that is to say they are opened together to prevent a flow of current or closed together to allow a flow of current, that is to say the mechanical contacts are connected to one another via a mechanical coupling (for example a switching shaft), the electronic switches S1, S2, S3 can be switched, by means of semiconductor-based switching elements, to a high-impedance state of the switching elements in order to prevent a flow of current, or to a low-impedance state of the switching elements to allow the flow of current.

According to the invention, the first, second and third electronic switches can be switched to a high-impedance or low-impedance state independently of one another. That is to say that the first, second and third electronic switches are switched to a high-impedance or low-impedance state independently of one another. In particular, in order to prevent or to enable a phase-conductor-dependent flow of current.

According to FIG. 1, first, second and third current sensor units SI1, SI2, SI3 are provided. The first current sensor unit SI1 is provided or arranged in the first series circuit SS1, the second current sensor unit SI2 is provided or arranged in the second series circuit SS2, and the third current sensor unit SI3 is provided or arranged in the third series circuit SS3, for determining in each case the level of the current in the first, second and third phase conductors L1, L2, L3 respectively, in particular, so that that instantaneous current values are available.

According to FIG. 1, the first mechanical phase contact K1, the second mechanical phase contact K2 and the third mechanical phase contact K3 are part of a mechanical isolating contact unit MK, which opens or closes the phase contacts K1, K2, K3 together. The mechanical isolating contact unit MK can have a handle HH accessible on the circuit breaker device for manually opening or closing the phase contacts (operated by a person). The mechanical isolating contact unit MK corresponds, for example, to a conventional unit, as is known from electromechanical circuit breaker devices (miniature circuit breakers, circuit breakers) (however, according to the invention, without elements for overcurrent detection or short-circuit detection, such as a bimetallic trip, etc.).

The circuit breaker device is configured, in particular, in such a way that the mechanical isolating contact unit MK can be opened, but not closed, by way of a control unit SE. In particular, closing of the mechanical isolating contact unit MK by way of the handle HH is only possible after an enable by way of the control unit SE. A release unit LC can be provided for this purpose. That is to say, the contacts can be closed by way of the handle HH only when the enable or an enable signal (from the control unit) is present. Without the enable or the enable signal, although the handle HH can be actuated, the contacts cannot be closed (“permanent slider contacts”).

The release unit LC may also be configured such that it is possible to open the contacts K1, K2, K3 of the mechanical isolating contact unit MK by way of a control signal from the control unit SE, as indicated in FIG. 1 by an arrow from the control unit SE to the release unit LC.

According to FIG. 1, the mechanical phase contacts K1, K2, K3 are assigned to the load-side phase connections/the load side Load and the electronic switches S1, S2, S3 are assigned to the grid-side phase connections/grid side Grid.

The first electronic switch S1, the second electronic switch S2 and the third electronic switch S3 may be part of an electronic interruption unit EU, wherein the electronic switches S1, S2, S3 can be switched independently of one another.

The electronic interruption unit/the electronic switches may have a bidirectional dielectric strength. Specifically, overvoltage protection is provided for the semiconductor-based switching elements in order to limit the voltages and thus have protection for the semiconductor-based switching elements.

The control unit SE is provided (as already partially mentioned), which is connected to the current sensor units SI1, SI2, SI3, the mechanical phase contacts K1, K2, K3 or the mechanical isolating contact unit MK (as shown in FIG. 1) and the electronic switches S1, S2, S3.

The current sensor units SI1, SI2, SI3 each determine the level of the current in their respective conductors, so that, in particular, instantaneous values of the current are available.

When at least one first current threshold value in a conductor is exceeded, a process for preventing the flow of current in the conductor in question is initiated by way of the electronic switch coming to have a high impedance.

The high impedance can be achieved, in particular, for a first period of time. After the period of time, the electronic switch in question can come to have a low impedance again.

Coming to have a low impedance can occur, in particular, in the next zero crossing or before or after the zero crossing of the voltage. (All 3 options—in the zero crossing, before the zero crossing or after the zero crossing—are possible, or if the magnitude falls below a voltage threshold, in particular 50 V, 25 V or 10 V).

In particular, the first time period may be less than 20 ms, especially less than 10 ms.

A differential current sensor unit ZCT may be provided (not shown in FIG. 1) for detecting differential currents of the low-voltage AC circuit, as is known, for example, from residual current circuit breakers. The differential current sensor unit ZCT is connected to the control unit SE.

The current sensor units SI1, SI2, SI3 are arranged in the example of FIG. 1 between grid-side connection terminals LG1, LG2, LG3 of the series circuit made up of the electronic switch S1, S2, S3 and the mechanical phase contact K1, K2, K3. Specifically, between grid-side connection terminals LG1, LG2, LG3 and the electronic switches S1, S2, S3. The current sensor units SI1, SI2, SI3 may also be arranged in other ways. For example, between electronic switch S1, S2, S3 and mechanical phase contact K1, K2, K3.

According to the invention, at least one temperature sensor TS1, TS2, TS3 is provided for each series circuit SS1, SS2, SS3. In the example of FIG. 1, two temperature sensors are provided for each series circuit.

In the first series circuit SS1 is provided a first grid-side temperature sensor TLG1 for the first grid-side phase connection terminal LG1 for the first phase conductor L1.

In the first series circuit SS1 is provided a first load-side temperature sensor TLL1 for the first load-side phase connection terminal LL1 for the first phase conductor L1.

In the second series circuit SS2 is provided a second grid-side temperature sensor TLG2 for the second grid-side phase connection terminal LG2 for the second phase conductor L2.

In the second series circuit SS2 is provided a second load-side temperature sensor TLL2 for the second load-side phase connection terminal LL2 for the second phase conductor L2.

In the third series circuit SS3 is provided a third grid-side temperature sensor TLG3 for the third grid-side phase connection terminal LG3 for the third phase conductor L3.

In the third series circuit SS3 is provided a third load-side temperature sensor TLL3 for the third load-side phase connection terminal LL3 for the third phase conductor L3.

The temperature sensors are each provided at, or in the region of, a connection terminal. The temperature sensors serve in particular to determine the level of the temperature of the respective connection terminals or in the region of the respective connection terminals.

The temperature sensors are each connected to the control unit SE, so that the control unit receives the level of the temperature (or an equivalent).

This means that each series circuit has at least one temperature sensor.

The circuit breaker device is designed in such a way that, if a first temperature threshold value 1.SW of a temperature sensor of a series circuit is exceeded, the electronic switch of the series circuit is switched to a high-impedance state for preventing a flow of current in order to prevent overheating (of the connection terminal).

As an alternative or in addition (for example in a configurable manner), if a first temperature threshold value of a temperature sensor of a series circuit is exceeded, all the electronic switches (of the series circuits in the circuit breaker device for the conductors of the low-voltage circuit) are switched to a high-impedance state for preventing a flow of current in order to prevent overheating.

Figure 2:
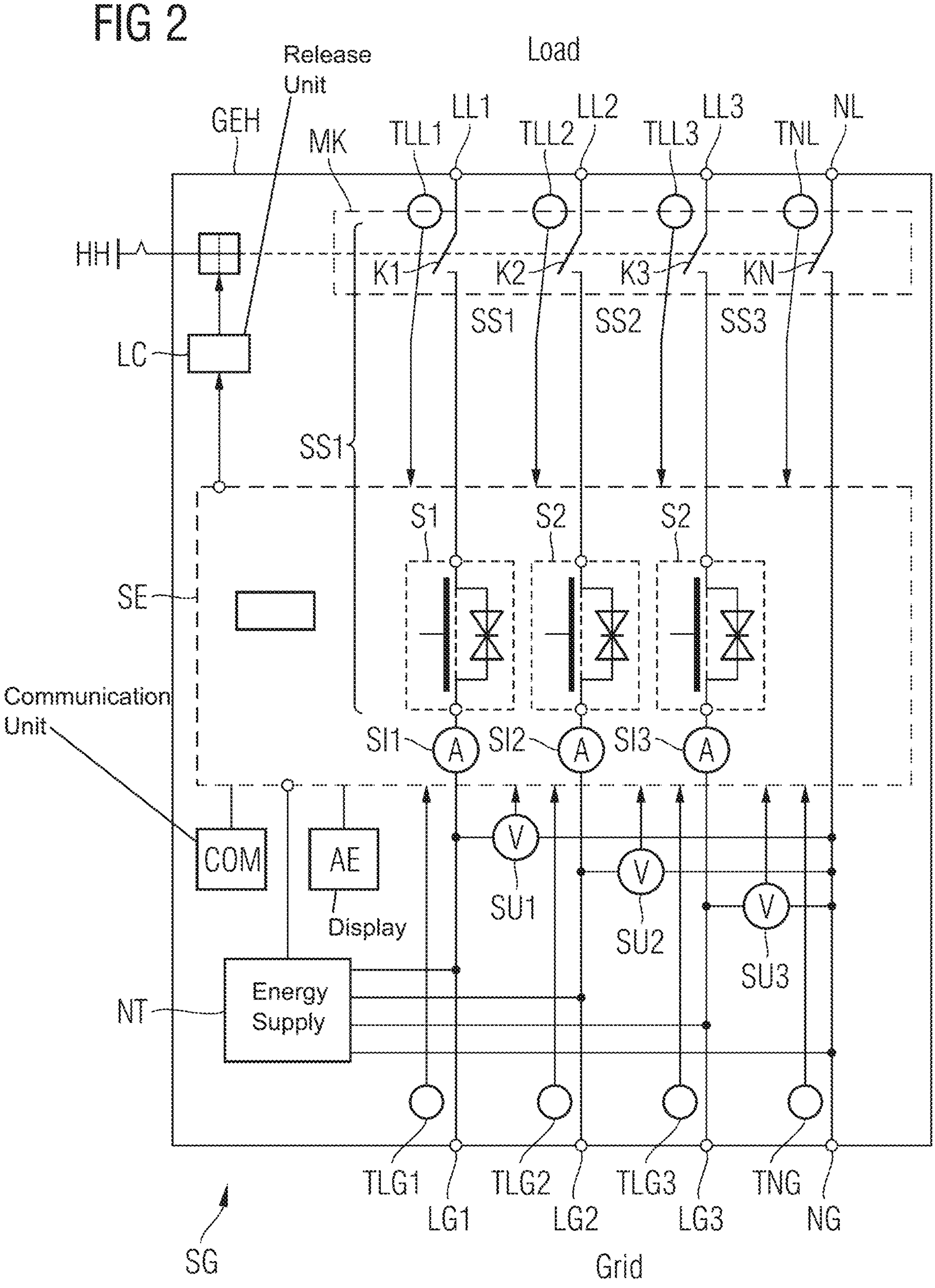
FIG. 2 is a schematic diagram of a second illustration of the circuit breaker device.

FIG. 2 shows an illustration in accordance with FIG. 1, with the following differences.

A grid-side neutral conductor connection terminal NG and a load-side neutral conductor connection terminal NL are provided for a neutral conductor N of the multi-phase low-voltage AC circuit, in the example according to FIG. 2 a three-phase low-voltage AC circuit with neutral conductor. According to FIG. 2, the grid-side neutral conductor connection terminal NG is connected to the load-side neutral conductor connection terminal NL via a neutral-conductor contact KN.

As an alternative, the grid-side neutral conductor connection terminal NG can also be connected directly (that is to say without a switchable contact) to the load-side neutral conductor connection terminal NL.

For the neutral-conductor connection terminals is provided at least one temperature sensor for determining the level of the temperature of at least one neutral-conductor connection terminal. In FIG. 2, a temperature sensor is provided for each neutral-conductor connection terminal. A neutral-conductor-side grid-side temperature sensor TNG is provided for the grid-side neutral-conductor connection terminal NG, and a neutral-conductor-side load-side temperature sensor TNL is provided for the load-side neutral-conductor connection terminal NL, so that it is possible to determine the level of the temperature of the grid-side neutral-conductor connection terminal NG and the level of the temperature of the load-side neutral-conductor connection terminal NL.

The neutral-conductor-side grid-side temperature sensor TNG and the neutral-conductor-side load-side temperature sensor TNL are connected to the control unit SE.

In this example, an electronic switch is not provided in the neutral conductor path in the housing of the circuit breaker device. This means that the neutral conductor connection between the grid-side neutral conductor connection NG and the load-side neutral conductor connection NL is free of electronic switches (electronic switch-free).

The mechanical neutral-conductor contact KN can advantageously be connected together with the phase contacts K1, K2, K3. This means that the mechanical neutral-conductor contact KN can be opened or closed together with the phase contacts K1, K2, K3, as described further above in relation to the contacts K1, K2, K3.

Specifically, the mechanical isolating contact unit MK can be configured in such a way that the neutral-conductor contact KN is closed before the phase contacts K1, K2, K3 are closed. Similarly, the neutral-conductor contact KN can be opened after the phase contacts K1, K2, K3 have been opened.

Furthermore, an energy supply NT is provided, such as a power supply unit, for the supply of energy to the circuit breaker device SG, in particular to the control unit SE.

In the example, the energy supply NT is connected on one side to the phase conductors L1, L2, L3 and (if necessary) to the neutral conductor N. It can also be connected only to some of the conductors (at least two) for the purpose of supplying energy. In the example, the energy supply NT is connected on the other side to the control unit SE.

On the other hand, the control unit SE is illustrated combined with the electronic switches S1, S2, S3 and the current sensor units SI1, SI2, SI3.

Furthermore, a voltage sensor unit is provided between each phase conductor and the neutral conductor. A first voltage sensor unit SU1 is provided between the first phase conductor L1 and the neutral conductor N, a second voltage sensor unit SU2 is provided between the second phase conductor L2 and the neutral conductor N, and a third voltage sensor unit SU3 is provided between the third phase conductor L3 and the neutral conductor N for determining the level of the voltage between the respective phase conductors and neutral conductor, in particular so that instantaneous voltage values are available. The voltage sensor units SU1, SU2, SU3 are connected to the control unit SE.

In the case of the electronic switches S1, S2, S3 coming to have a low impedance, which is initiated by way of the control unit SE, for example:

- if the change to low impedance is initiated by a user, or
- if the change to low impedance is initiated by the circuit breaker device, specifically if a third temperature threshold value 3.SW is undershot, the electronic switch in question can come to have a low impedance at (in the region of, see above) the associated zero crossing of the voltage.

As already mentioned, the voltage sensor units SU1, SU2, SU3 are to this end connected to the control unit SE, which is also connected to the current sensor units SI1, SI2, SI3, the temperature sensors TS1, TS2, TS3, the mechanical phase contacts K1, K2, K3 (or mechanical isolating contact unit MK) and the electronic switches. The circuit breaker device can also advantageously be designed in such a way that when at least one first current threshold value (specifically instantaneous value of the current) is exceeded in a phase conductor, a process for preventing a flow of current in the phase conductor in question is initiated by the electronic switch in question. At the next or next-but-one zero crossing of the voltage, the electronic switch comes to have a low impedance again to allow a flow of current.

This can be done several times until a first number of repetitions are exceeded. Then:

- all of the electronic switches may come to have a high impedance, or (/and)
- the contacts may be opened (galvanic isolation).

Any combinations (intermediate combinations) from the illustrations of the exemplary circuit breaker devices according to FIGS. 1 and 2 are possible (for example energy supply NT from FIG. 2 in FIG. 1, etc.).

High impedance is used to mean a state in which only a current of a negligible magnitude flows. In particular, high impedance is used to mean resistance values of greater than 1 kilohm, preferably greater than 10 kilohms, 100 kilohms, 1 megaohm, 10 megaohms, 100 megaohms, 1 gigaohm or greater.

Low impedance is used to mean a state in which the current value indicated on the circuit breaker device could flow.

In particular, low impedance is used to mean resistance values of less than 10 ohms, preferably less than 1 ohm, 100 milliohms, 10 milliohms, 1 milliohm or less.

The electronic switches S1, S2, S3 and the electronic interruption unit EU may have semiconductor components such as bipolar transistors, field-effect transistors (FET), isolated gate bipolar transistors (IGBT), metal oxide layer field-effect transistors (MOSFET) or other (self-commutated) power semiconductors. In particular, IGBTs and MOSFETs are particularly well suited for the electronic switches (as semiconductor-based switching elements) on account of low forward resistances, high junction resistances and a good switching behavior.

Mechanical contacts or a mechanical isolating contact unit MK is used to mean, in particular, a (standards-compliant) isolating function implemented by the isolating contact unit MK. An isolating function is used to mean the following points:

- minimum clearance in air according to the standard (minimum distance between the contacts),
- contact position indication of the contacts of the mechanical isolating contact system,
- actuation/interruption of the contacts of the mechanical isolating contact system (by the control unit) always possible (no (permanent) blocking of the contacts in the closed state by the handle possible).

The minimum clearance in air between the contacts of the isolating contact system is substantially voltage-dependent. Further parameters are the pollution degree, the type of field (homogeneous, inhomogeneous) and the barometric pressure and the height above sea level.

There are corresponding rules or standards for these minimum clearances in air or creepage distances. These rules specify, for example in air for an impulse withstand voltage, the minimum clearance in air for an inhomogeneous and a homogeneous (ideal) electrical field on the basis of the pollution degree. The impulse withstand voltage is the strength to withstand an applied corresponding impulse voltage. The isolating contact system or circuit breaker device has an isolating function (isolator property) only when this minimum length (minimum distance) is present.

In the context of the invention, the DIN EN 60947 and IEC 60947 series of standards, to which reference is made here, are relevant to the isolator function and its properties.

The isolating contact system is advantageously characterized by a minimum clearance in air of the open isolating contacts in the OFF position (open position, open contacts) on the basis of the rated impulse withstand voltage and the pollution degree. The minimum clearance in air is, in particular, between (a minimum of) 0.01 mm and 14 mm.

In particular, the minimum clearance in air is advantageously between 0.01 mm at 0.33 kV and 14 mm at 12 kV, in particular for pollution degree 1 and in particular for inhomogeneous fields.

The minimum clearance in air can advantageously have the following values:

TABLE 13

Minimum clearances in air

| Rated impulse withstand voltage | $U_{imp}$ Minimum clearances in air mm Case A inhomogeneous field (see 3.7.63) pollution degree | | | | Case B inhomogeneous field, ideal conditions (see 3.7.62) pollution degree | | | |
|---|---|---|---|---|---|---|---|---|
| kV | 1 | 2 | 3 | 4 | 1 | 2 | 3 | 4 |
| 0.33 | 0.01 | 0.2 | 0.8 | 1.6 | 0.01 | 0.2 | 0.8 | 1.6 |
| 0.5 | 0.04 | | | | 0.04 | | | |
| 0.8 | 0.1 | | | | 0.1 | | | |
| 1.5 | 0.5 | 0.5 | | | 0.3 | 0.3 | | |
| 2.5 | 1.5 | 1.5 | 1.5 | | 0.6 | 0.6 | | |
| 4.0 | 3 | 3 | 3 | 3 | 1.2 | 1.2 | 1.2 | |
| 6.0 | 5.5 | 5.5 | 5.5 | 5.5 | 2 | 2 | 2 | 2 |
| 8.0 | 8 | 8 | 8 | 8 | 3 | 3 | 3 | 3 |
| 12 | 14 | 14 | 14 | 14 | 4.5 | 4.5 | 4.5 | 4.5 |

NOTE
The specified minimum clearances in air are based on the 1.2/50 μs impulse voltage at an atmospheric pressure of 80 kPa, which corresponds to the atmospheric pressure at 2000 m above sea level The pollution degrees and types of field correspond to those defined in the standards. This advantageously allows a standards-compliant circuit breaker device dimensioned according to the rated impulse withstand voltage to be achieved.

In particular, a mechanical isolating contact unit does not mean a relay contact.

The control unit SE may have a microcontroller (microcontroller unit).

The circuit breaker device may have an (in particular wireless) communication unit COM, which is connected to the control unit SE or is a part of it.

A warning can be issued by means of the communication unit COM when a fourth temperature threshold value is exceeded. As an alternative or in addition, the level of the temperature of at least one temperature sensor, of some of the temperature sensors or of all the temperature sensors can be issued (communicated) by means of the communication unit COM (or an equivalent of this).

A display unit AE can also be provided. The display unit AE can be configured as a combined display and input unit. The display unit AE (display and input unit) is connected to, or is part of, the control unit SE. The display unit has display means visible on the circuit breaker device, in particular for displaying the high-impedance or low-impedance state of the electronic switches. As an alternative or in addition, for displaying the exceeding of temperature limits (first or/and second or/and third or/and fourth) or (and) the level of the temperature of at least one temperature sensor, some of the temperature sensors, or all of the temperature sensors.

When a first temperature threshold value 1.SW of the at least one temperature sensor of the neutral-conductor connection terminals is exceeded, the electronic switches of the series circuits are switched to a high-impedance state for preventing a flow of current in order to prevent overheating. That is to say, when a neutral-conductor connection terminal temperature is too high, all the phase conductors change to high impedance.

Alternatively, all the mechanical contacts can be opened.

Figure 3:
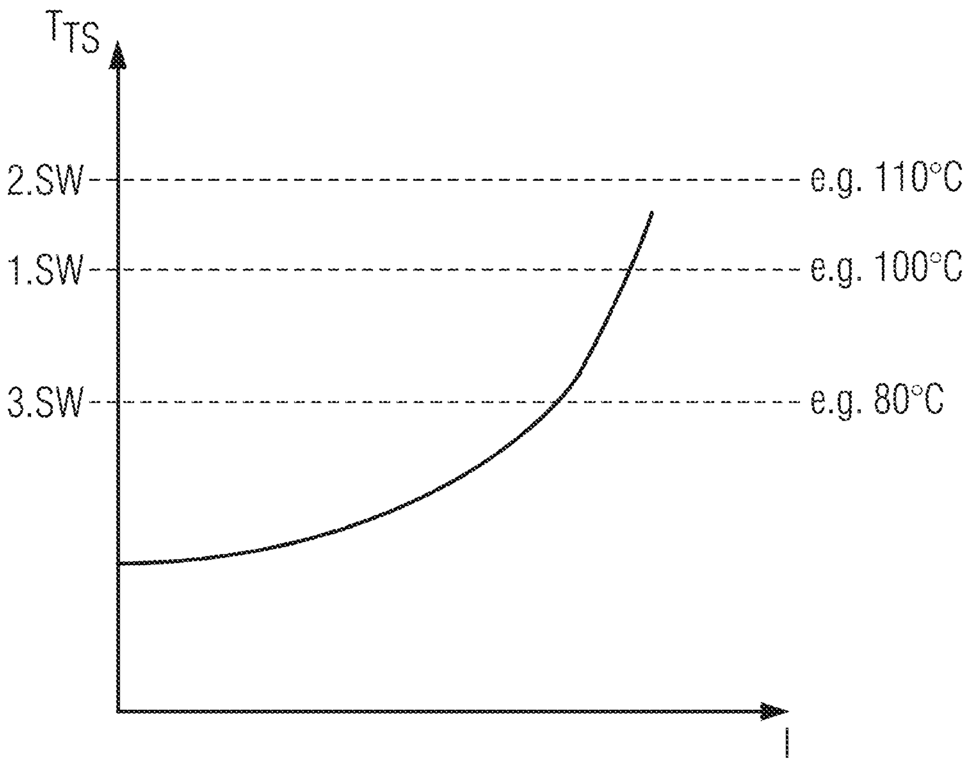
FIG. 3 is a first illustration of a graph.

FIG. 3 shows an illustration of a first graph or coordinate system in which the level of the current I in a phase conductor (such as L1, L2 or L3) of the low-voltage AC circuit is plotted on the horizontal axis (abscissa), and the level of the temperature TTS of a temperature sensor (e.g. TLL1, TLL2, TLL3, TLG1, TLG2 or TLG3) associated with the selected phase-conductor current is plotted on the vertical axis (ordinate) (e.g. current I in L2=>level of temperature TTS of TLL2 or TLG2).

It shows the variation in the temperature TTS of the temperature sensor as a function of the level of the current I in the phase conductor of the low-voltage circuit.

It is assumed that the heating in the circuit breaker device, specifically at the (selected) connection terminal (in the event of a fault), is dependent on the level of the current I in the associated (relevant) phase conductor of the low-voltage circuit through the circuit breaker device (the circuit breaker device is intended to protect the low-voltage circuit). As the level of the current I in the (selected) phase conductor increases, the temperature of the temperature sensor of the connection terminal in question (and in general in parts of the circuit breaker device) rises. Thus, the temperature TTS determined by the temperature sensor increases. The temperature increases monotonically with the level of the current. In addition to the level of the current, the ambient temperature also has an influence on the heating. This is not shown in FIG. 3 for simpler illustration.

According to FIG. 3, various temperature threshold values are plotted: a first temperature threshold value 1.SW, in the example 100° C.; a second temperature threshold value 2.SW, in the example 110° C.; a third temperature threshold value 3.SW, in the example 80° C.

Figure 4:
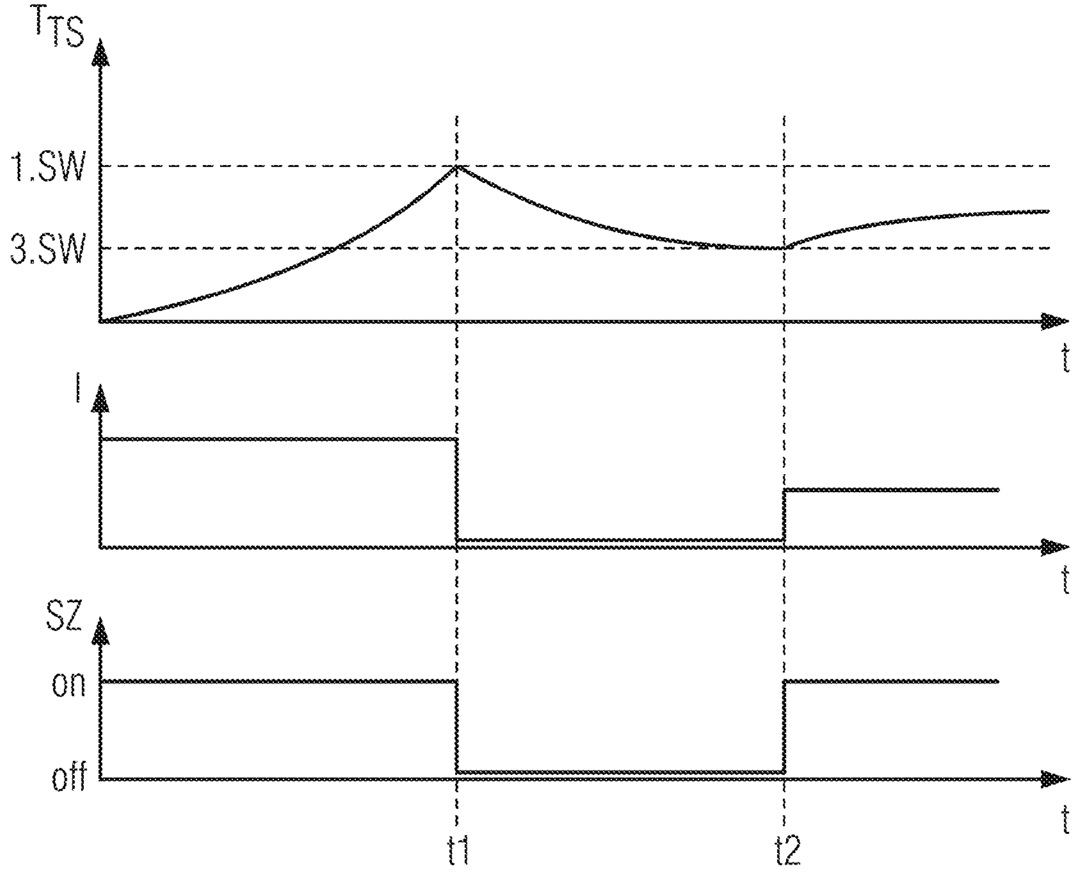
FIG. 4 is a second illustration of a graph.

FIG. 4 shows an illustration according to FIG. 3, with the difference that three correlated graphs are shown, and the time t is plotted on the horizontal axis (abscissa).

In the upper region of FIG. 4, the level of the temperature TTS of the (selected) temperature sensor TS is plotted as a function of time t. The first temperature threshold value 1.SW and the third temperature threshold value 3.SW are shown.

In the middle region of FIG. 4, the level of the current I is plotted as a function of time t.

In the lower region of FIG. 4, the switching state SZ of the electronic switch in question is plotted as a function of time t. A low-impedance state of the electronic switch is denoted by on. A high-impedance state of the electronic switch is denoted by off.

For example, a (constant) current I or a current I with a constant root mean square value of a first level for a certain time flows (center of FIG. 4). Corresponding heating occurs at the (faulty) connection terminal. The temperature at the connection terminal/the determined level of the temperature TTS of the temperature sensor increases until the first temperature threshold value 1.SW is reached at the first time t1 (top of FIG. 4).

When the first temperature threshold value 1.SW is reached or exceeded, in the example 100° C., the electronic switch in question is switched to a high-impedance state off (of the switching elements) to prevent a flow of current in the phase conductor in question of the connection terminal, first time t1 (bottom of FIG. 4). This prevents further heating and overheating (and associated damage) of the connection terminal.

The circuit breaker device can cool down. At a second time t2, the third temperature threshold value 3.SW, in the example 80° C., is reached or undershot. When the third temperature threshold value 3.SW is reached or undershot, the electronic switch is (again) switched (at the second time t2) to a low-impedance state on (for allowing a flow of current in the low-voltage circuit) (bottom of FIG. 4). The current I can (from the second time t2) flow again (center of FIG. 4). The temperature may rise again (top of FIG. 4).

The third temperature threshold value is lower than the first temperature threshold value.

As an alternative or in addition, instead of the third temperature threshold value 3.SW, it is possible to wait for a first period of time to elapse after the start of the high-impedance state of the switching elements. After a first period of time has elapsed since the start of the high-impedance state of the electronic switch, the electronic switch is switched to the low-impedance state (not shown).

If the change between the high-impedance state for preventing overheating and back to the low-impedance state is too frequent, the mechanical contacts (if applicable, the mechanical isolating contact unit MK) are opened. This means that the mechanical contacts are opened in the event of a change (toggle) between the high-impedance state for preventing overheating and back to the low-impedance state, the change exceeding a first number, within a first time frame.

Figure 5:
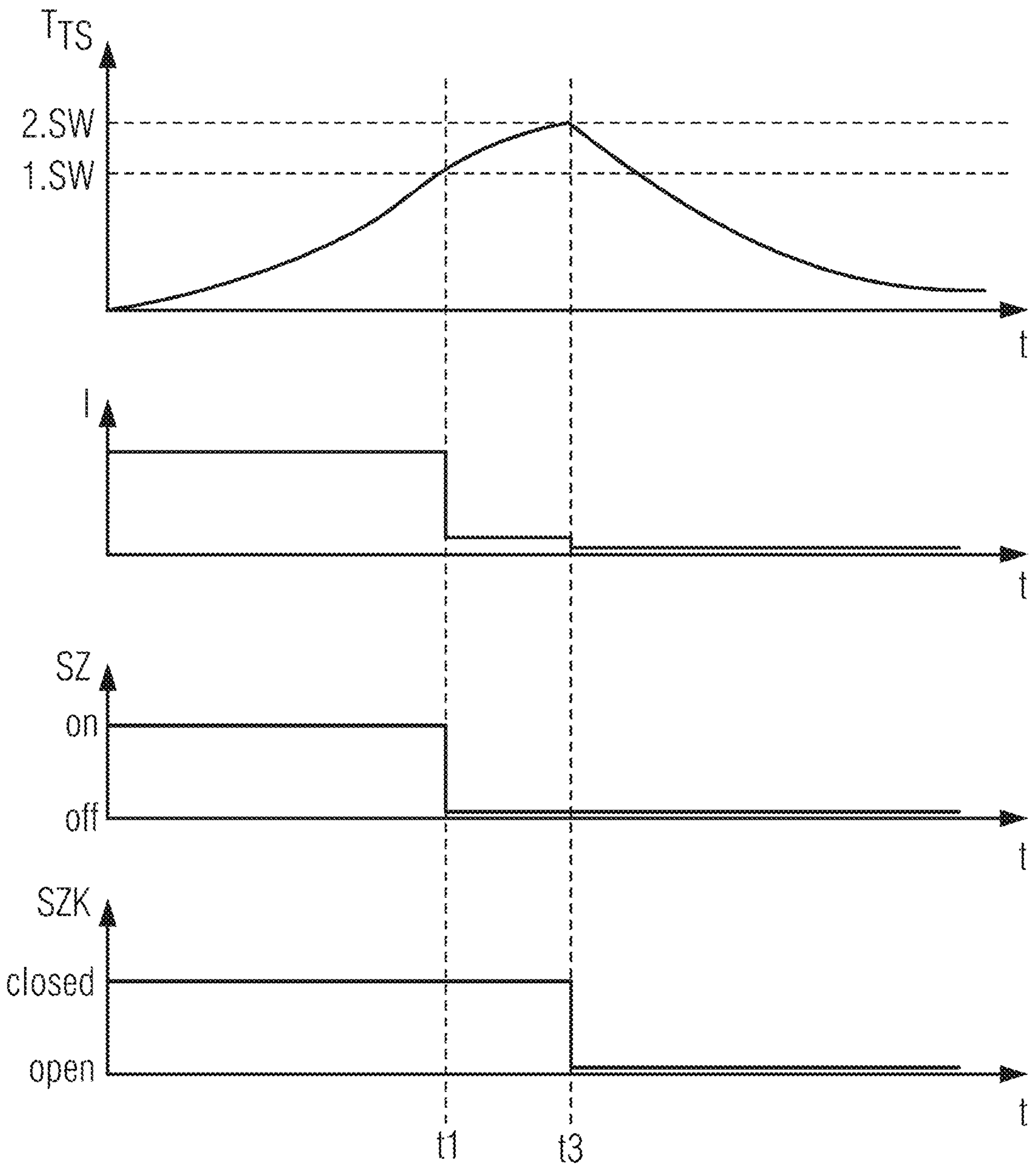
FIG. 5 is a third illustration of a graph.

FIG. 5 shows an illustration according to FIG. 4, with the difference that it shows a fourth graph that correlates to the three upper graphs.

The fourth graph in the lowest region of FIG. 5 shows the switching state of the mechanical contacts SZK as a function of the time t. A closed state of the contacts is denoted by closed. An open state of the contacts is denoted by open.

Furthermore, the upper region of FIG. 5 shows the first temperature threshold value 1.SW and the second temperature threshold value 2.SW.

For example, a (constant) current I of a first level flows for a certain time (center of FIG. 5). Corresponding heating occurs at the (faulty) connection terminal. The temperature/the determined level of the temperature TTS of the temperature sensor increases until the first temperature threshold value 1.SW is reached at the first time t1 (top of FIG. 5).

When the first temperature threshold value 1.SW is reached or exceeded, in the example 100° C., the electronic switch is switched to a high-impedance state off (of the switching elements) in order to prevent a flow of current, first time t1 (bottom of FIG. 5).

The current is reduced (center of FIG. 5).

Even though the electronic switch is switched to a high impedance, if the temperature now rises further, for example because the electronic switch is defective (that is to say the high-impedance state is initiated, but for example is not or not fully effective) and a (lower) current flows, the contacts are opened when the second temperature threshold value 2.SW, in the example 110° C., is reached or exceeded (bottom of FIG. 5), third time t3.

The second temperature threshold value 2.SW is higher than the first temperature threshold value 1.SW.

Figure 6:
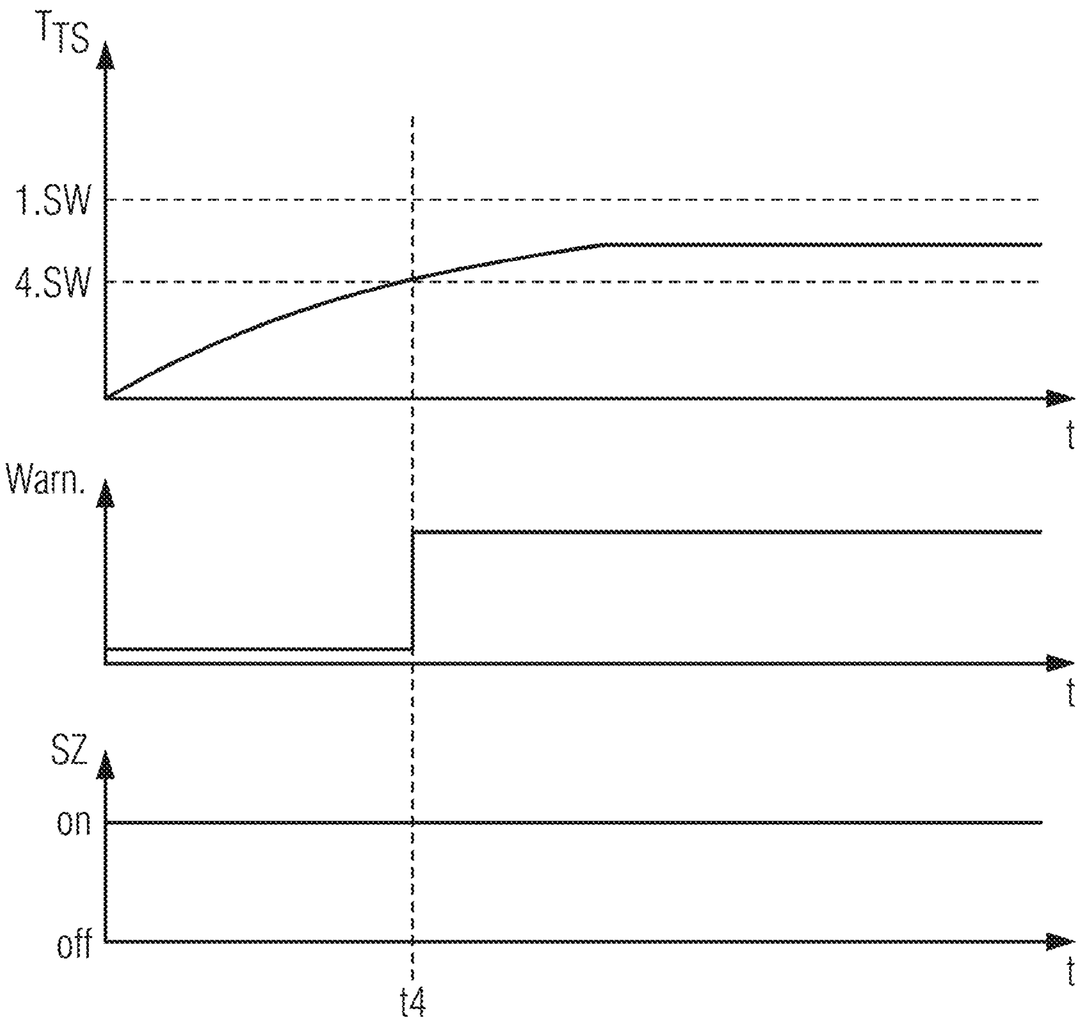
FIG. 6 is a fourth illustration of a graph.

FIG. 6 shows an illustration according to FIG. 4, with the difference that the middle area of FIG. 6 shows the issuing of a warning Warn. as a function of the time t.

Furthermore, the upper region of FIG. 6 shows the first temperature threshold value 1.SW and the fourth temperature threshold value 4.SW. If the fourth temperature threshold value is exceeded at the fourth time t4, a warning Warn. is issued (wirelessly/in wired fashion) by means of the communication unit COM. For example, to a higher-level management system. As an alternative or in addition, the warning can be displayed, for example using the display unit AE. The fourth temperature threshold value is lower than the first temperature threshold value.

The electronic switch remains in the low-impedance state on.

As an alternative or in addition, the level of the temperature can be issued (wirelessly/in wired fashion) by means of the communication unit COM, for example, to a higher-level management system. As an alternative or in addition, the level of the temperature can be displayed, for example using the display unit AE.

Figure 7:
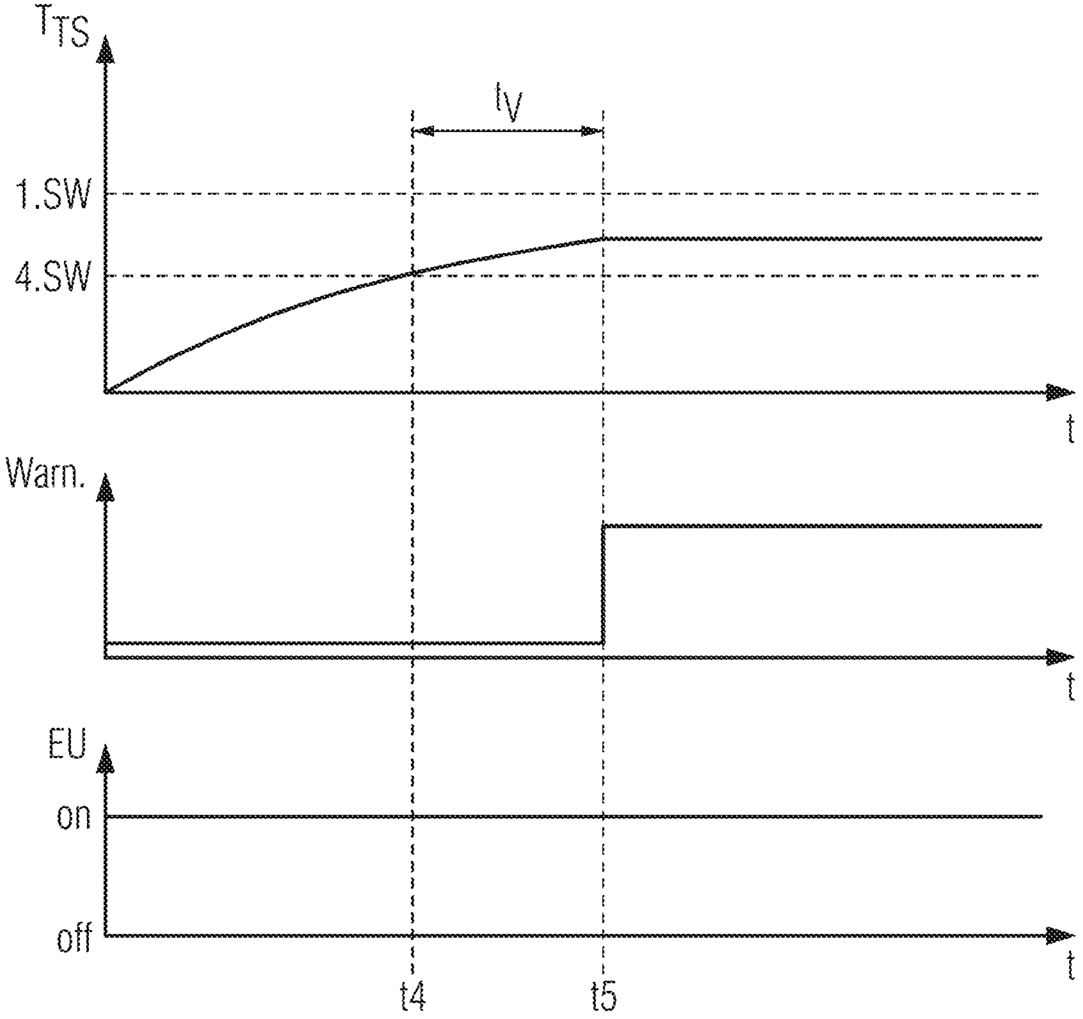
FIG. 7 is a fifth illustration of a graph.

FIG. 7 shows an illustration according to FIG. 6, with the difference that the warning Warn. is issued with a time offset (time delay) tV. This means that when the fourth temperature threshold value 4.SW is exceeded at the fourth time t4, no warning Warn. is issued, but the warning Warn. is only issued at a fifth time t5, as shown in FIG. 7. It is thus possible, for example, to avoid warnings based on short-term warming due to briefly increased start-up or switching currents. If the temperature TTS has dropped below the fourth temperature threshold value 4.SW again before reaching the fifth time t5, no warning Warn. is issued. The time offset (time delay) tV is in the range from one second, . . . , 5 seconds, . . . 10 seconds, . . . 1 minute.

Individual monitoring of the temperature of at least one or both connection terminals can advantageously be carried out for each phase conductor, and the current in the phase conductor can be reduced individually. The circuit is interrupted (mechanically/electrically) only if the heating continues, which indicates a fault in the electronic switch.

It is likewise possible to communicate or display the attainment of the first temperature threshold value 1.SW, the second temperature threshold value 2.SW, the third temperature threshold value 3.SW or/and fourth temperature threshold value 4.SW, in particular of the phase conductor in question.

The invention is explained again in other words below.

An electrical (sub) distribution system contains a large number of different protective and switching devices, which are connected to one another via appropriate cables. When designing such a subdistribution system, thermal considerations and calculations must also be carried out, as losses occur in the subdistribution system due to ohmic losses on the lines and the electrical equipment. This heats up the subdistribution system. Today, thermal overload is prevented by appropriate (over) dimensioning (in accordance with standards, guidelines or regulations).

Apart from the aforementioned thermal designs of an electrical subdistribution system, the electrical connection points (connection terminals) frequently lead to thermal overloads and fires. These can arise as a result of faulty commissioning or else as a result of ageing (corrosion).

Installer regulations and insurers today stipulate visual inspections by qualified electricians. However, these inspections may not find every faulty connection point.

According to the invention, a temperature measurement is implemented at (selected/the) connection terminals of the circuit breaker device. The temperature sensors and the additional device components are connected to the control unit, so that here a suitable algorithm can switch off the device before a hazardous temperature occurs at the connection points/connection terminals, and thereby protect the device/subdistribution system from a dangerous fire.

Recent electronic protective and switching devices use electronic switching elements (power semiconductors) in the main current path. When a critical temperature is reached, a high-impedance state is initiated. This means that current can no longer flow through the circuit breaker device and allows the connection terminal (and the subdistribution system) to cool down.

An appropriate warning message can also be issued.

Since current is no longer flowing through the device, this cools down again. Once the temperature has gone below a certain temperature, the device can automatically switch back to the low-impedance state for allowing a flow of current (hysteresis).

Depending on the device configuration, an opening of the contacts of the mechanical isolating contact unit can also be initiated instead of the low-impedance state. An automatic restart after cooling is then not possible. It is necessary to manually close the contacts again.

Although the invention has been described and illustrated in more detail by way of the exemplary embodiment, the invention is not restricted by the disclosed examples and other variations may be derived therefrom by a person skilled in the art without departing from the scope of protection of the invention.

The invention claimed is:

1. A circuit breaker for protecting an electrical multi-phase low-voltage AC circuit, said circuit breaker comprising:

a housing having connection terminals including grid-side phase connection terminals and load-side phase connection terminals for phase conductors of said electrical multi-phase low-voltage AC circuit;

series circuits each having a mechanical phase contact and an electronic switch with a semiconductor-based switching element, wherein each said series circuit electrically connects one of said grid-side phase connection terminals to one of said load-side phase connection terminals, mechanical phase contacts being switched to open together to prevent a flow of current or to close together to allow the flow of the current, electronic switches being switched, by means of semiconductor-based switching elements, to a high-impedance state of said semiconductor-based switching elements to prevent the flow of the current, or to a low-impedance state of said semiconductor-based switching elements to allow the flow of the current;

said circuit breaker is configured such that said electronic switches can be switched independently of one another to the high-impedance state or the low-impedance state;

each of said series circuits having at least one temperature sensor for determining a level of a temperature of at least one of said grid-side phase connection terminals or said load-side phase connection terminals of a respective one of said series circuits; and said circuit breaker being configured such that, when a first temperature threshold value of said at least one temperature sensor of a series circuit of said series circuit is exceeded, said electronic switch of said series circuit is switched to the high-impedance state for preventing the flow of the current to prevent overheating.

2. The circuit breaker according to claim 1, further comprising:

current sensors, one of said current sensor is provided for each of said series circuits for determining a level of the current in a respective one of said phase conductors;

a controller connected to said current sensors, temperature sensors, said mechanical phase contacts and said electronic switches; and said circuit breaker is configured such that when at least one said first current threshold value is exceeded in a phase conductor, a process for preventing the flow of the current in said phase conductor is initiated by said electronic switch associated with the phase conductor.

3. The circuit breaker according to claim 2, further comprising a communication unit connected to said controller.

4. The circuit breaker according to claim 3, wherein a warning is issued by means of said communication unit when a fourth temperature threshold value of said at least one temperature sensor is exceeded.

5. The circuit breaker according to claim 3, wherein the level of the temperature of said at least one temperature sensor or an equivalent is issued by means of said communication unit.

6. The circuit breaker according to claim 2, wherein said mechanical phase contacts can be opened, but not closed, by way of said controller.

7. The circuit breaker according to claim 2, further comprising a mechanical handle, wherein said mechanical phase contacts can be operated by way of said mechanical handle in order to switch between opening said mechanical phase contacts or closing said mechanical phase contacts.

8. The circuit breaker according to claim 7, wherein said mechanical phase contacts have a release functionality such that said mechanical phase contacts can be opened by way of said controller, even if said mechanical handle is blocked.

9. The circuit breaker according to claim 1, wherein:

said mechanical phase contacts are assigned to said load-side phase connection terminals; and said electronic switches are assigned to said grid-side phase connection terminals.

10. The circuit breaker according to claim 1, further comprising:

neutral-conductor connection terminals including a grid-side neutral-conductor connection terminal and a load-side neutral-conductor connection terminal;

at least one further temperature sensor for said neutral-conductor connection terminals for determining a level of a temperature of at least one of said neutral-conductor connection terminals;

a mechanical neutral-conductor contact connecting said grid-side neutral-conductor connection terminal to said load-side neutral-conductor connection terminal, said mechanical neutral-conductor contact being switched together with said mechanical phase contacts; and said circuit breaker configured such that when a first temperature threshold value of said at least one further temperature sensor of said neutral-conductor connection terminals is exceeded, said electronic switches of said series circuits are switched to the high-impedance state for preventing the flow of the current to prevent overheating.

11. The circuit breaker according to claim 1, wherein said mechanical phase contacts are opened in a case of an initiated high-impedance state of one of said electronic switches for preventing overheating and when a higher second temperature threshold value is exceeded.

12. The circuit breaker according to claim 11, wherein in a case of the high-impedance state of said electronic switch for preventing overheating, and when a third temperature threshold value is undershot, said electronic switch is switched to the low-impedance state.

13. The circuit breaker according to claim 1, wherein in a case of the high-impedance state of said electronic switch for preventing overheating, and when a first time period has elapsed since a start of the high-impedance state for preventing overheating, said electronic switch is switched to the low-impedance state.

14. The circuit breaker according to claim 1, wherein said at least one temperature sensor of each of said series circuits is disposed at, or in a region of a connection terminal of said grid-side phase connection terminals or said load-side phase connection terminals in each case.

15. The circuit breaker according to claim 1, wherein said mechanical phase contacts are opened in an event of a change to the high-impedance state for preventing overheating, the change exceeding a first number, within a first time frame.

16. The circuit breaker according to claim 1, wherein when the first temperature threshold value of said at least one temperature sensor of one of said series circuits is exceeded, all said electronic switches are switched to the high-impedance state for preventing the flow of the current in order to prevent overheating.

17. A method for a circuit breaker for protecting an electrical multi-phase low-voltage AC circuit, the circuit breaker containing:

a housing having grid-side phase connection terminals and load-side phase connection terminals for phase conductors of the electrical multi-phase low-voltage AC circuit;

series circuits each having a mechanical phase contact and an electronic switch with a semiconductor-based switching element, wherein each of the series circuits connects one of the grid-side phase connection terminals to one of the load-side phase connection terminals, each said mechanical phase contact is opened together to prevent a flow of current or closed together to allow the flow of the current, each said electronic switch being switched, by means of the semiconductor-based switching element, to a high-impedance state of the semiconductor-based switching element in order to prevent the flow of the current or to a low-impedance state of said semiconductor-based switching element to allow the flow of the current, said electronic switches being switched independently of one another to the high-impedance or the low-impedance state to prevent or enable a phase-conductor-dependent flow of the current;

which comprises the steps of:

determining, via at least one temperature sensor associated with each of the series circuits, a level of a temperature of at least one connection terminal of a respective one of the series circuits; and switching the electronic switch of a series circuit of the series circuits to the high-impedance state for preventing the flow of the current to prevent overheating when a first temperature threshold value of the at least one temperature sensor of the series circuit is exceeded.

18. The method according to claim 17, which further comprises determining a level of the current in a respective said series circuits, and when the first current threshold value is exceeded in one of said respective series circuits, a process for preventing the flow of the current in the one series circuit is initiated by the electronic switch.

19. The method according to claim 17, wherein mechanical phase contacts are opened in a case of an initiated high-impedance state of one of the electronic switches for preventing overheating when a higher second temperature threshold value is exceeded.

20. The method according to claim 17, which further comprises switching the electronic switch to the low-impedance state in a case of the high-impedance state of said electronic switch for preventing overheating if a third temperature threshold value is undershot.

21. The method according to claim 17, wherein in a case of the high-impedance state of the electronic switch for preventing overheating, and when a first time period has elapsed since a start of the high-impedance state for preventing overheating, the electronic switch is switched to the low-impedance state.

22. The method according to claim 17, which further comprises opening the mechanical phase contacts in an event of a change to the high-impedance state for preventing overheating, the change exceeding a first number, within a first-time frame.

23. The method according to claim 17, which further comprises issuing a warning when a fourth temperature threshold value is exceeded.

24. The method according to claim 17, which further comprises outputting the level of the temperature of the at least one temperature sensor or an equivalent.

25. The method according to claim 17, wherein a grid-side temperature sensor and a load-side temperature sensor are provided for each of the series circuits, for determining a level of a temperature of said grid-side phase connection terminal and said load-side phase connection terminal of a respective one of said series circuits.

26. The method according to claim 17, which further comprises switching all of the electronic switches to the high-impedance state for preventing the flow of the current in order to prevent overheating when the first temperature threshold value of the at least one temperature sensor of a series circuit of the series circuits is exceeded.

* * * * *